(12) United States Patent
Downey et al.

(10) Patent No.: US 6,217,115 B1
(45) Date of Patent: Apr. 17, 2001

(54) SIMPLIFIED LINKAGE ASSEMBLY

(75) Inventors: Hugh D. Downey, Barrie; Trajan Quinn, Toronto; Pascal Garrido, Gravehurst, all of (CA); Nils O. Olsson, Glen Ellyn, IL (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/295,247

(22) Filed: Apr. 20, 1999

(51) Int. Cl.[7] .................................. B60N 2/12; B60N 2/18
(52) U.S. Cl. ................ 297/330; 297/344.1; 297/344.15; 297/344.2; 248/421; 403/277; 403/279
(58) Field of Search ................................ 297/330, 344.1, 297/344.18, 344.2, 344.13, 344.15; 248/421, 424, 429; 403/277, 278, 279, 281

(56) References Cited

U.S. PATENT DOCUMENTS

| | | | |
|---|---|---|---|
| 4,010,533 | * | 3/1977 | Pitner ............................... 403/277 X |
| 4,760,634 | | 8/1988 | Rapp . |
| 4,831,704 | | 5/1989 | Rapp . |
| 4,880,199 | * | 11/1989 | Harney ............................ 248/421 X |
| 5,310,154 | * | 5/1994 | Ueda et al. ...................... 248/421 X |
| 5,498,091 | * | 3/1996 | Chan ................................ 403/277 |
| 5,984,562 | * | 11/1999 | Brandenstein et al. ............ 403/279 |

FOREIGN PATENT DOCUMENTS

0215449B1    5/1991   (EP) .

\* cited by examiner

Primary Examiner—Peter M. Cuomo
Assistant Examiner—Rodney B. White
(74) Attorney, Agent, or Firm—Robert K. Roth; Richard M. Mescher

(57) ABSTRACT

A linkage assembly is used to vertically adjust the position of a seat. The linkage assembly includes a first link that is connected to a second link without the use of fasteners. The first link has a first mounting portion and the second link has a second mounting portion. The first mounting portion is deformed into engagement with the second mounting portion to rotatably connect the first link to the second link. In one embodiment, the first mounting portion is an extrusion that extends through an aperture in the second link. An end of the extrusion is deformed into engagement with the second link to form a lip to lock the first link to the second link and allow relative rotational movement between the first and second links while eliminating relative linear movement therebetween. In an alternative embodiment, portions of the first and second links are deformed into locking engagement.

10 Claims, 3 Drawing Sheets

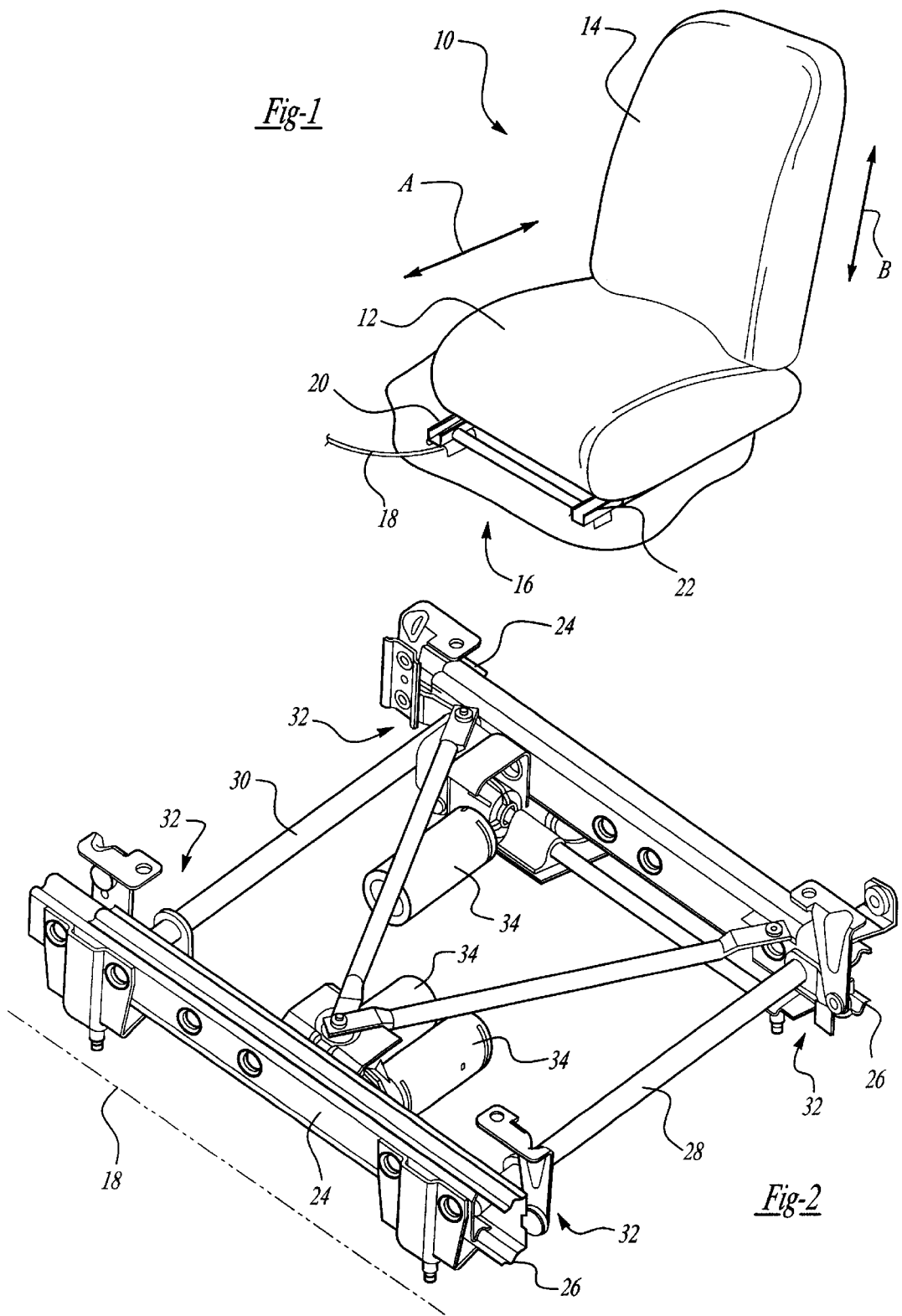

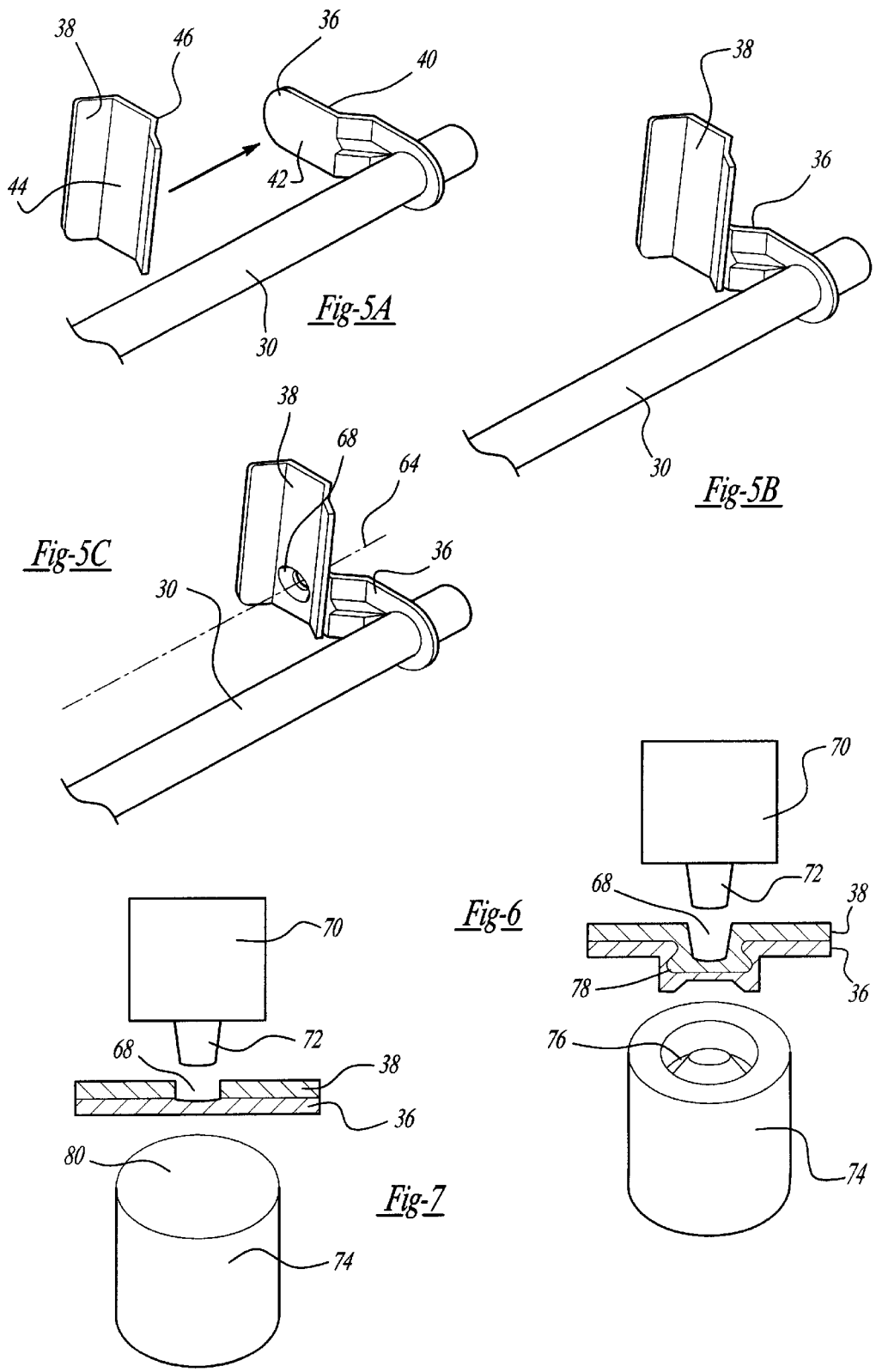

SIMPLIFIED LINKAGE ASSEMBLY

BACKGROUND OF THE INVENTION

This application relates to a linkage assembly where a first link is joined to a second link without fasteners. The linkage assembly allows articulation between linkages while eliminating undesirable free play.

Linkage assemblies are often used in seat assemblies to provide various functions including seat adjustment capability. Linkage assemblies typically include two or more link members, which are joined to each other by fasteners. The use of fasteners adds cost to the seat and lengthens assembly time.

The link members typically receive input from an adjuster control member which causes the links to rotate relative to one another to achieve a desired vertical position. In known links, as the links rotate, there has typically been free play or linear movement between the links. This free play is detrimental to the stability of the adjuster.

Various methods have been used to eliminate the free play between link members. Often bushings are used with the fasteners in the link assembly to take up the free play. The bushings permit the links to rotate relative to one another while providing a tight fit. This is expensive and requires additional assembly time and materials.

Thus, it is desirable to eliminate the use of fasteners and bushings from linkage assemblies by providing a linkage assembly with interconnected links to allow relative rotational movement between links while eliminating free play between the links. By eliminating the use of fasteners and bushings, the cost of the linkage assembly is reduced and assembly time is decreased.

SUMMARY OF THE INVENTION

A linkage assembly includes at least a first link and a second link that are rotatably mounted together without the use of fasteners. The first link has a first mounting portion and the second link has a second mounting portion that is aligned with the first mounting portion. The first mounting portion is deformed into engagement with the second mounting portion to rotatably connect the first link to the second link.

The preferred inventive method for connecting two links includes providing a first link having a first mounting portion and a second link having a second mounting portion, aligning the first mounting portion with the second mounting portion, and interconnecting the first and second mounting portions to allow relative rotational movement between the first and second links while eliminating free play. Preferably, a portion of one of the links is plastically deformed into engagement with the other link to lock the links together. The links are free to rotate about an axis but are prohibited from axial movement along the axis.

Deforming the body portion of the fastener eliminates undesirable free play between the two members while still allowing the members to rotate with respect to each other. Deforming a portion of one of the links into locking engagement with the other link eliminates the use of fasteners and the operation is easily performed, easily maintained, and is inexpensive. These and other features can be understood from the following specification and drawings.

BRIEF DESCRIPTION OF THE DRAWINGS

FIG. 1 is a perspective view of seat assembly mounted to a vehicle structure with a track assembly.

FIG. 2 perspective view of the track assembly with the inventive linkage assemblies.

FIG. 5A is a partial exploded view, partially cut-away, showing an alternative embodiment of the linkage assembly.

FIG. 5B is a perspective view, partially cut-away, showing an intermediate step of the linkage assembly process for the embodiment shown in FIG. 5A.

FIG. 5C is a perspective view, partially cut-away, showing a final assembly of the linkage assembly for the embodiment shown in FIG. 5A.

FIG. 6 is a schematic exploded view of one joining method for the embodiment shown in FIG. 5A.

FIG. 7 is a schematic exploded view of an alternative joining method for the embodiment shown in FIG. 5A.

DETAILED DESCRIPTION OF THE PREFERRED EMBODIMENT

Figure 3A:
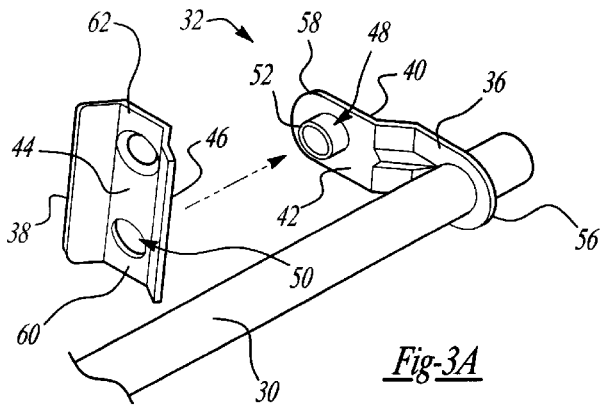
FIG. 3A is a partial exploded view, partially cut-away, showing one embodiment of the linkage assembly.

A vehicle seat assembly is shown generally at 10 in FIG. 1. The vehicle seat assembly 10 includes a seat bottom 12, a seat back 14 supported relative to the seat bottom 12, and a track assembly 16 for mounting the seat 10 to a vehicle structure 18, such as a floor. The track assembly 16 includes an inboard track 20 and an outboard track 22. The track assembly 16 is used to horizontally adjust the position of the seat between forward and rearward positions as indicated by arrow A. The seat 10 can also be adjusted vertically between raised and lowered positions as indicated by arrow B.

As shown in FIG. 2, each of the inboard 20 and outboard 22 tracks have a first member 24 mounted to the vehicle structure 18 and a second member 26 mounted for movement relative to the first member 24 to horizontally adjust the position of the seat 10.

A first torque tube 28 extends between the inboard 20 and outboard 22 tracks at a forward position and a second torque tube 30 extends between the inboard 20 and outboard 22 tracks at a rearward position. At least one linkage assembly 32 is mounted on each of the first 28 and second 30 torque tubes to vertically adjust the position of the seat 10. Preferably each torque tube 28, 30 includes a pair of linkage assemblies 32 with one linkage assembly 32 mounted on the torque tube 28, 30 adjacent the inboard track 20 and one linkage assembly 32 mounted adjacent the outboard track 22.

Electric motors 34 provide the power to horizontally and vertically adjust the position of the seat 10. While an electrically powered seat is shown, it should be understood that the inventive linkage assembly 32 could also be used in seat adjusters that are manually controlled.

Figure 3B:
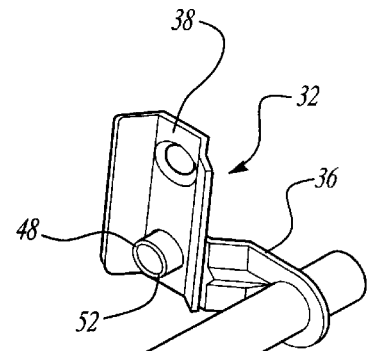
FIG. 3B is a perspective view, partially cut-away, showing an intermediate step of the linkage assembly process for the embodiment shown in FIG. 3A.
Figure 3C:
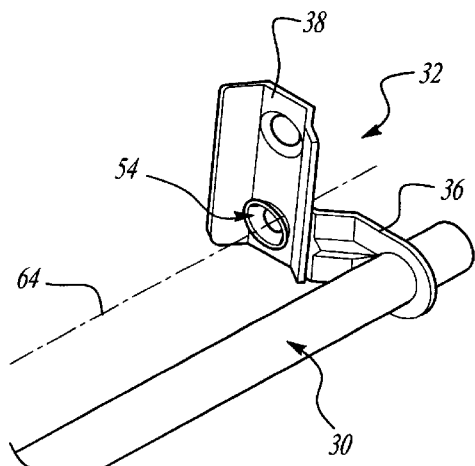
FIG. 3C is a perspective view, partially cut-away, showing a final assembly of the linkage assembly for the embodiment shown in FIG. 3A.

As shown in FIGS. 3A–C, the linkage assemblies 32 each include a first link 36 with a first mounting portion and a second link 38 with a second mounting portion. The first mounting portion is deformed into engagement with the second mounting portion to rotatably connect the first link 36 to the second link 38. The deformation process will be discussed in greater detail below.

The first link 36 includes a first external surface 40 and a first internal surface 42. The second link 38 includes a second external surface 44 and a second internal surface 46. In one embodiment, the first mounting portion is an extrusion 48 extending outwardly from the internal surface 42 of the first link 36 and the second mounting portion is an aperture 50 in the second link 38 that receives the extrusion 48. The first internal surface 42 bears against the second internal surface 46 when the extrusion 48 is inserted into the aperture 50.

An end 52 of the extrusion 48 is flared or deformed into engagement with the second external surface 44 of the second link 38 to form a lip 54 to lock the first link 36 to the second link 38. This joining method provides a tight fit and allows relative rotational movement between the first 36 and second 38 links while eliminating relative linear movement or free play between the links 36, 38.

One end 56 of the first link 36 is supported on the torque tube 30 for movement with the torque tube 30. The extrusion 48 is adjacent to an opposite end 58 of the first link 36 and connects the first link 36 to the second link 38 as discussed above. One end 60 of the second link 38 is connected to the first link 36 and an opposite end 62 of the second link 38 is operably connected to the seat bottom 12. The second link 38 can be connected directly to the seat bottom 12 or seat pan, or the second link 38 can be connected to other mounting brackets or links that are connected to the seat bottom 12. While only one linkage assembly 32 is shown in FIGS. 3A–C it should be understood that the other linkage assemblies 32 mounted on the torque tubes 28, 30 are of similar construction. Also, while only two links 36, 38 are shown, it should be understood that the linkage assembly 32 could include additional link members.

Figure 4A:
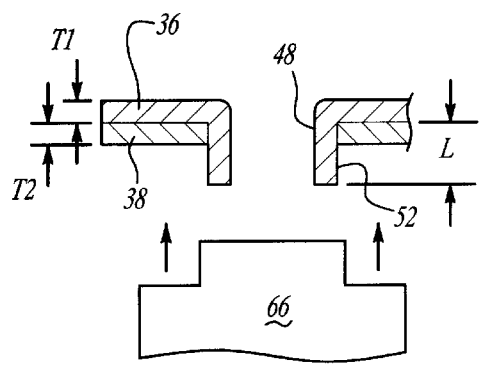
FIG. 4A is a cross-sectional view of the linkage assembly shown in FIG. 3C before deformation.

As shown in FIG. 4A, the first link 36 has a first thickness T1, the second link 38 has a second thickness T2, and the extrusion 48 has a length L that is greater than the thickness T2 of the second link 38. When the internal face 42 of the first link 36 is placed against the internal face 46 of the second link 38 and the extrusion 48 is inserted through the aperture 50 of the second link 38, an end portion 52 of the extrusion 48 extends beyond the links 36, 38 as assembled.

A tooling member 66, well known in the art, is used to flare out the end 52 of the extrusion 48 and press the end 52 against the second link 38. The tooling member 66 provides a longitudinal load that plastically deforms the end 52 of the extrusion 48. First, a subassembly comprised of the first link 36 and the second link 38. The subassembly is held fixed and the tooling member 66 is moved along a linear path toward the subassembly to engage the end 52 for deformation.

Figure 4B:
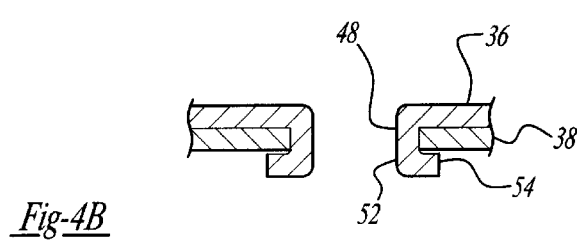
FIG. 4B is a cross-sectional view of the linkage assembly shown in FIG. 3C after deformation.

The linear or longitudinal load bends the end 52 of the extrusion 48 transversely with respect to the linear load. This forms a lip 54 for engaging the external surface 44 of the second link 38, as shown in FIG. 4B. The second link 38 is locked to the first link 36 via the lip 54 and the links 36, 38 can rotate relative to one another about an axis of rotation 64. The fit between the links 36, 38 is tight enough to prevent axial movement along the axis 64 but is loose enough to allow rotation.

While the first link 36 is shown mounted to the torque tube 28, 30 with an extrusion 48 at one end and the second link 38 is shown as having the aperture 50, it should be understood that the link 36 mounted to the torque tube 28, 30 could have the aperture 50 with the other link 38 having the extrusion 48.

FIGS. 5A–C show an alternative joining method. In this embodiment, the first 36 and second 38 links present generally flat internal 42, 46 and external 40, 44 surfaces, as shown in FIG. 5A. The internal surface 42 of the first link 36 is positioned against the internal surface 46 of the second link 38 and the links 36, 38 are held fixed relative to each other, as shown in FIG. 5B. A portion of each link 36,38 is deformed to form a pocket 68, as shown in Figure 5C. The pocket 68 defines a center that lies on the axis of rotation 64 and the first 36 and second 38 links are rotatable relative to each other about the axis 64 but are prohibited from axial movement along the axis 64. The pocket 58 is preferably circular in shape to facilitate rotation.

FIG. 6 shows a tooling member 70 with a tapered head portion 42 that is used to form the pocket 68. The links 36, 38 are laid against one another and are supported on a base 74. The tooling member 70 is then moved toward the links 36, 38 and the tapered head 72 is pressed against the outer link 38. The head 72 applies a load against the external surface 44 of the link 38 causing both links 36, 38 to deform. As the links 36, 38 deform, link material is squeezed away from the head 72 and the links 36, 38 become locked together. This method is similar to a joining method that is generally described in U.S. Pat. No. 4,760,634, which shows a method for forming a seam between metal plates to lock the plates together and prevent any movement between the plates. The links 36, 38 shown in FIGS. 5A–C are to be pressed together so that the links 36, 38 cannot become separated from one another, but the links 36, 38 must be able to rotate freely with respect to each other.

FIG. 6 shows one embodiment of a base member 74 that has an opening 76 for molding the pocket 68 as the links 36, 38 are deformed. Preferably the opening 76 has a larger diameter at the lower end such that the link material from the outer link 38 flows outwardly underneath the internal surface 46 to form a locking flange 78 to firmly lock the links 36, 38 together.

FIG. 7 shows an alternative embodiment of the base member 74 that has a generally flat surface 80 against which the links 36, 38 rest. The tooling head 72 is pressed against the links 36, 38 and the link material flows outwardly away from the head 72 to form the pocket 68 and lock the links 36, 38 together.

The method for connecting the first link 36 to the second link 38 includes the steps of providing a first mounting portion on the first link 36 and a second mounting portion on the second link 38, aligning the first mounting portion with the second mounting portion, and interconnecting the first and second mounting portions to allow relative rotational movement between the first 36 and second 38 links while eliminating free play. Additional steps include deforming the first mounting portion into engagement with the second mounting portion to lock the first 36 and second 38 links together.

Preferably, a subassembly comprised of the first link 36 and the second link 38 is created and the subassembly is held fixed while a tooling member 66 is moved along a linear path toward the subassembly to apply a longitudinal load to the first mounting portion.

In one embodiment, the method requires the additional steps of providing the first link 36 with a first external surface 40, a first internal surface 42, and an extrusion 48 defining the first mounting portion and providing the second link 38 with a second external surface 44, a second internal surface 46, and an aperture 50 extending between the surfaces 44, 46. The extrusion 48 is into the aperture 50 and an end 52 of the extrusion 48 is deformed into engagement with the second external surface 44 of the second link 38. A longitudinal load is applied to the end 52 of the extension 48 to cause plastic deformation. Preferably, the method includes the steps of providing the extrusion 48 with a length that is greater than thickness of the second link 38, holding the internal surface 42 of the first link 36 against the internal surface 46 of the second link 38 during step, and inserting the extrusion 48 through the aperture 50 such that the extrusion 48 extends beyond the external surface 44 of the second link 38 before the longitudinal load is applied. The longitudinal load is applied to the end 52 of the extrusion 48 and the end 52 is bent transversely with respect to the longitudinal load to form a lip 54 that partially engages the external surface 44 of the second link 38.

In an alternative embodiment, the first internal surface 42 is engaged with the second internal surface 46 and the first 36 and second 38 links are held fixed relative to one another while a longitudinal load is applied against one of the external surfaces 40, 44 to deform a portions of the first 36 and second 38 links into locking engagement with each other. The deformed portions of the first 36 and second 38 links form a pocket 68 defining a center with the first 36 and second 38 links being rotatable relative to each other about the center.

The use of the subject linkage assembly 32 provides relative rotational movement between links 36, 38 while eliminating undesirable free play or relative linear movement between the links 36, 38. This eliminates the need for expensive fasteners or bushings, thus reducing cost and assembly time.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A linkage assembly comprising, in combination:
    a track assembly comprising inboard and outboard tracks, with each inboard and outboard track having a first member adapted to be mounted to a vehicle structure and a second member second member mounted for movement relative to the first member;
    a rotatable first torque tube extending between the inboard and outboard tracks at a forward position;
    a rotatable second torque tube extending between the inboard and outboard tracks at a rearward position;
    a first link having a first mounting portions and attached to rotate with the first torque tube; and
    a second link having a second mounting portion aligned with the first mounting portion, wherein the first mounting portion is deformed into engagement with said second mounting portion to rotatably connect the first link to the second link.

2. An assembly as recited in claim 1 wherein the first link comprises a first external surface, a first internal surface, and an extrusion defining the first mounting portion and the link comprises a second external surface, a second internal surface, and an aperture extending therebetween wherein the first internal surface bears against the second internal surface when the extrusion is inserted into the aperture.

3. An assembly as recited in claim 2 wherein the external surface of the first link is generally free of deformation as the first portion of the first link is deformed into engagement with the second portion of the second link.

4. An assembly as recited in claim 1 wherein said first link includes a first deformed portion and the second link includes a second deformed portion in sliding engagement with the first deformed portion to allow the first and second links to rotate relative to each other.

5. An assembly as recited in claim 4 wherein first and second deformed portions form a pocket defining a center axis of rotation, the first and second links being rotatable relative to each other about the axis but prohibited from axial movement along the axis.

6. A vehicle seat comprising, in combination:
    a seat bottom;
    a seat back supported relative to the seat bottom;
    a track assembly for mounting the seat to a vehicle structure, the track assembly including an inboard track and an outboard track, each of the inboard and outboard tracks having a first member adapted to be mounted to a vehicle structure and a second member mounted for movement relative to the first member to horizontally adjust the position of the seat;
    a first torque tube extending between the inboard and outboard tracks at a forward position;
    a second torque tube extending between the inboard and outboard tracks at a rearward position; and
    at least one linkage assembly mounted on each of the first and second torque tubes to vertically adjust the position of the seat, the linkage assemblies including a first link with a first mounting portion and a second link with a second mounting portion;
    wherein the first mounting portion is deformed into engagement with the second mounting portion to rotatably connect the first link to the second link.

7. A vehicle seat as recited in claim 6 wherein the first mounting portion is positioned adjacent one end of the first link and an opposite end of the first link is mounted for rotation with the torque tube and the second mounting portion is positioned adjacent one end of the second link and an opposite end of the link is operably connected to the seat bottom.

8. An assembly as recited in claim 7 wherein the first link comprises a first external surface, a first internal surface, and an extrusion defining the first mounting portion and the second link comprises a second external surface, a second internal surface, and an aperture extending therebetween wherein the first internal surfaces slidably engage the second internal surface when the extrusion is inserted into the aperture.

9. An assembly as recited in claim 8 wherein an end of the extrusion is deformed into engagement with the second external surface of the second link to form a lip to lock the first link to the second link and allow relative rotational movement between the first and second links while eliminating relative linear movement therebetween.

10. An assembly as recited in claim 9 wherein the first link includes a first portion and the second link includes a second portion, the first and second portions being plastically deformed into sliding engagement with each other to allow the first and second links to rotate relative to one another.

* * * * *